V. R. KOONTZ.
DRILL CHUCK.
APPLICATION FILED FEB. 24, 1913.

1,091,886. Patented Mar. 31, 1914.

Witnesses

Victor R. Koontz,
Inventor
by C. A. Snow & Co.
Attorneys

UNITED STATES PATENT OFFICE.

VICTOR R. KOONTZ, OF WAYNESBORO, PENNSYLVANIA.

DRILL-CHUCK.

1,091,886.

Specification of Letters Patent. Patented Mar. 31, 1914.

Application filed February 24, 1913. Serial No. 750,396.

*To all whom it may concern:*

Be it known that I, VICTOR R. KOONTZ, a citizen of the United States, residing at Waynesboro, in the county of Franklin and State of Pennsylvania, have invented a new and useful Drill-Chuck, of which the following is a specification.

The present invention relates to improvements in drill chucks, the primary object of the present invention being the provision of a novel means, whereby the drill may be inserted and removed during the rotation of the chuck, and which after properly inserted is held both against longitudinal and rotary movement independent of the chuck.

A further object of the present invention is the provision of a novel means for locking and releasing the drill carrying member within the chuck, so that the same will under normal conditions be rotated therewith and held against longitudinal movement, there being means provided whereby the locking means may be readily released during the rotation of the chuck so that the bit carrying member may be removed and inserted at will.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
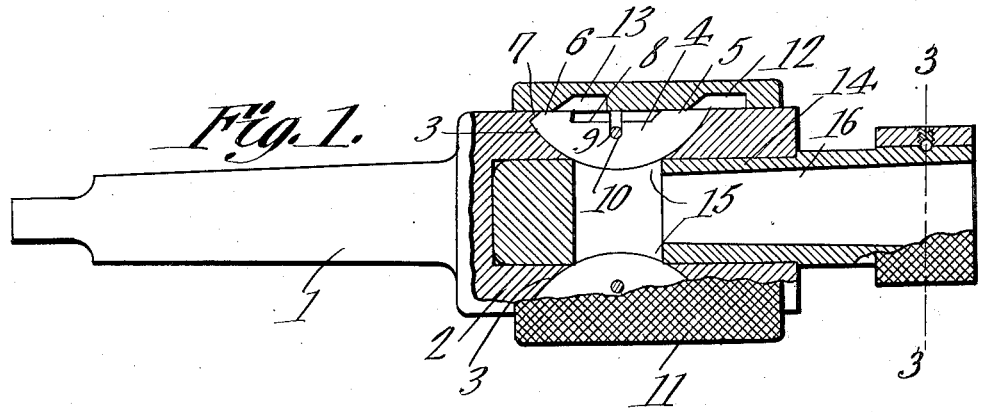
Figures 2, 3:
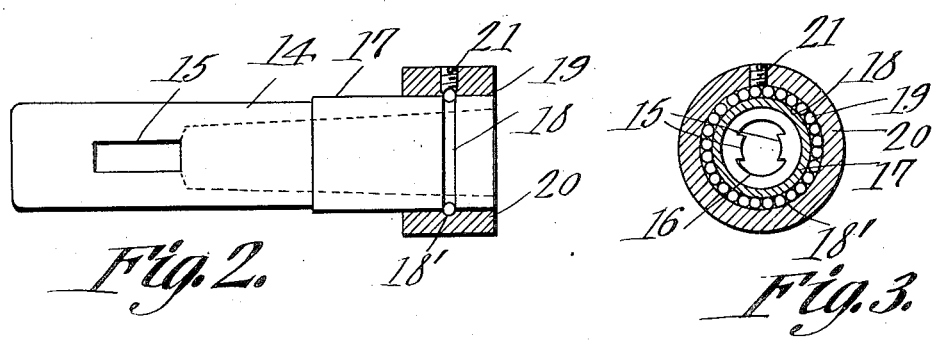
Figures 4, 5:
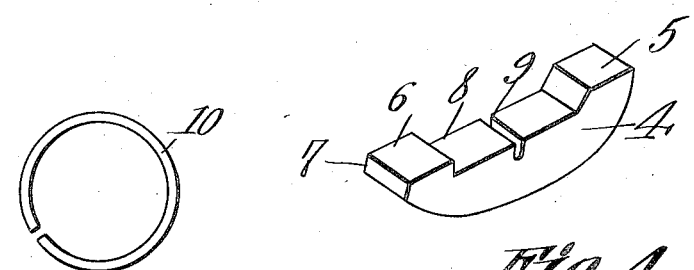

In the drawings—Figure 1 is a view showing the chuck and drill carrying member partially in longitudinal section to illustrate the positioning of the parts when in locked position. Fig. 2 is a side elevation of the bit carrying member showing the anti-frictionally supported finger piece in section. Fig. 3 is a section taken on line 3—3 of Fig. 1. Fig. 4 is a perspective view of one of the locking members. Fig. 5 is a detail view of the main open ring spring for maintaining the locking members in locked relation.

Referring to the drawings, the numeral 1 designates the spindle of the main chuck, whose enlarged socketed end 2 is provided with diametrically disposed curved recesses 3, for the sliding reception of the locking members or locks 4, the engaging faces of which are struck upon a curve disposed to aline with the curve of the respective recesses 3 so that a portion of the locking member will project within the socket of the member 2. By this means a lock at two points is provided within the chuck member so as to hold the bit carrying member 14 in fixed relation to the chuck 2. Each of the locking members, as clearly illustrated in Fig. 4, is provided with the offset ends 5 and 6, the end 6 being provided with the cut away inclined portion 7, while formed between the projections 5 and 6 is the long recessed portion 8 provided with the transversely disposed groove 9, said grooves of both members being so positioned as to receive the open spring ring 10, as clearly illustrated in Fig. 1, so that both members 4 have a normal tension to project within the socket of the chuck, to engage within the slot or depressions 15 of the bit carrying member 14, as will presently appear.

In order to provide a means for permitting the retraction of the locking members 4 and also to maintain them in projected position to lock the member 14 against independent longitudinal and rotary movements, a knurled sleeve 11 is disposed for sliding movement upon the outer surface of the enlarged end 2 of the chuck, the said member 11 being provided with the two recessed portions 12 and 13, which as said member 11 is moved to the left, as shown in Fig. 1, will be positioned in alinement with the respective projecting ends 5 and 6 of the members 4, so that as the member 14 is moved outwardly or inwardly, the members 4 will be caused to be moved outwardly with the respective projections 5 and 6 projected or seated within the respective recesses 12 and 13.

The drill carrying member 14, as clearly shown, is provided with a transversely disposed slot 15, which is diametrically disposed to receive the projecting portion of the locking members 4 as the member 14 is moved inwardly or outwardly of the socketed member 2, the spring 10 having a normal tension to snap such members 4 into such recess 15 to lock the member 14 for fixed movement with the chuck member 2.

The member 14 is provided with the drill receiving socket 16, and with the enlarged diametered portion 17 which provides a shoulder to limit the inward movement of the member 14 relatively to the socket of the chuck.

In order to provide a means, whereby the member 14 with the bit (not shown) may be removed while the shank 1 and chuck member 2 are being rotated, thus not necessitating the stopping of the lathe or drill press, the knurled sleeve 20 is disposed about the outer end 17 of the member 14 and is held against longitudinal movement and also practically frictionless by means of the grooves 18 and 18', and the anti-frictional balls 19, there being provided a removable screw plug 21 to permit of the introduction of the balls in the position clearly shown in Figs. 1, 2 and 3.

What is claimed is:

1. A drill chuck, including a shank, a socketed drill carrying receiving member, a plurality of spring projected drill member engaging members, each of said drill member engaging members being provided with a pair of projections, and a longitudinally slidable sleeve mounted upon the chuck member and provided with a plurality of recesses to be disposed into and out of registration with the projections of the locking members to maintain the members in projected position and to permit of the retraction thereof to release the drill carrying member.

2. A drill chuck, including a shank, an enlarged socketed head carried thereby, said head being provided with diametrically disposed slots through the walls thereof, a locking member disposed in each wall, each of said locking members being provided with two spaced projections disposed to normally register with the circumferential surface of the enlarged head, a spring for maintaining all of the locking members projected, and a sleeve mounted for longitudinal sliding movement upon the enlarged head, said sleeve being provided with two recessed portions, whereby the sleeve normally holds the locking members in projected position and when moved to place the recesses in registration with the projecting ends of the locking members permits the retraction of the locking members.

In testimony that I claim the foregoing as my own, I have hereto affixed my signature in the presence of two witnesses.

VICTOR R. KOONTZ.

Witnesses:
JOHN B. STONER,
JOSEPHINE ROLLMAN.